United States Patent
Greco

(10) Patent No.: US 7,779,200 B2
(45) Date of Patent: Aug. 17, 2010

(54) METHOD AND APPARATUS FOR A MAGNETIC TAPE STORAGE SYSTEM TO ADAPTIVELY HANDLE SPACE COMMANDS

(75) Inventor: Paul M. Greco, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 207 days.

(21) Appl. No.: 11/250,084

(22) Filed: Oct. 13, 2005

(65) Prior Publication Data
US 2007/0088911 A1   Apr. 19, 2007

(51) Int. Cl.
G06F 12/00    (2006.01)
G06F 13/00    (2006.01)
G06F 13/28    (2006.01)

(52) U.S. Cl. ..................................................... 711/111
(58) Field of Classification Search ........................ None
See application file for complete search history.

(56) References Cited

U.S. PATENT DOCUMENTS

| | | | |
|---|---|---|---|
| 3,984,814 A | 10/1976 | Bailey, Jr. et al. | |
| 5,034,914 A | 7/1991 | Osterlund | 364/900 |
| 5,150,473 A | 9/1992 | Zulch | 395/425 |
| 6,496,877 B1 | 12/2002 | Greenberg et al. | |
| 7,099,988 B2 * | 8/2006 | Dahman et al. | 711/5 |
| 2003/0225969 A1 | 12/2003 | Uchida et al. | |
| 2005/0088771 A1 * | 4/2005 | Jaquette et al. | 360/73.04 |

OTHER PUBLICATIONS

Highsmith, "Messy, Exciting, and Anxiety-Ridden: Adaptive Software Development", Jan. 1997, American Programmer, vol. X, 9 pages.*
Peterson,Working Draft SCSI-3 Stream Commands (SSC),Jan. 2000,T10.org,Revision 22,8 pages.*

* cited by examiner

*Primary Examiner*—Christian P Chace
*Assistant Examiner*—Gary W Cygiel
(74) *Attorney, Agent, or Firm*—Zilka-Kotab, PC

(57) ABSTRACT

A method for a tape storage system to adaptively handle Space commands sent from a host computer system is disclosed. In response to a Space command from the host computer system, a determination is made as to whether or not the tape storage system is in a Read mode. If the tape storage system is in a Read mode, the estimated cost of performing a special read operation for the Space command is compared with the estimated cost of performing a normal space operation for the Space command. If the estimated cost for performing a special read operation is lower than the estimated cost for performing a normal space operation, then a special read operation is performed. But if estimated cost for performing a special read operation is higher than the estimated cost for performing a normal space operation, then a normal space operation is performed.

12 Claims, 2 Drawing Sheets

METHOD AND APPARATUS FOR A MAGNETIC TAPE STORAGE SYSTEM TO ADAPTIVELY HANDLE SPACE COMMANDS

BACKGROUND OF THE INVENTION

1. Technical Field

The present invention relates to magnetic tape storage systems in general. More particularly, the present invention relates magnetic tape storage systems capable of receiving commands from a host computer system. Still more particularly, the present invention relates to a method and apparatus for a magnetic tape storage system to adaptively handle Space commands sent from a host computer system.

2. Description of Related Art

Magnetic tape storage systems remain to be the most efficient and cost-effective means for providing data backup for computer systems because no other storage technology offers the same low-cost/high-capacity combined advantage. Data required by a computer system can be written to or read from a magnetic tape within a magnetic tape storage system. By sending various commands to the magnetic tape storage system, the computer system can control the operations of the magnetic tape storage operation.

During a read operation, the computer system sometimes needs to direct the magnetic tape storage system to fast forward the magnetic tape to various specific locations in order for data at those specific locations of the magnetic tape to be read. A command that the computer system utilizes to instruct the magnetic tape storage system to fast forward by skipping certain portions of the magnetic tape during a read operation is called a Space command.

Typically, a Space command is issued between two Read commands. For example, the computer system may issue a Read command to the magnetic tape storage system in order to read data from a first location of a magnetic tape, and then the computer system may issue a Space command before issuing another Read command to the magnetic tape storage system for reading data from a second location that is not contiguous from the first location on the magnetic tape.

The present disclosure provides a method and apparatus for a magnetic tape storage system to adaptively handle Space commands from an associated computer system.

SUMMARY OF THE INVENTION

In accordance with a preferred embodiment of the present invention, a tape storage system is coupled to a host computer system. In response to a Space command from the host computer system, a determination is made as to whether or not the tape storage system is in a Read mode. If the tape storage system is in a Read mode, the estimated cost of performing a special read operation for the Space command is compared with the estimated cost of performing a normal space operation for the Space command. If the estimated cost for performing a special read operation is lower than the estimated cost for performing a normal space operation, then a special read operation is performed. But if estimated cost for performing a special read operation is higher than the estimated cost for performing a normal space operation, then a normal space operation is performed.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
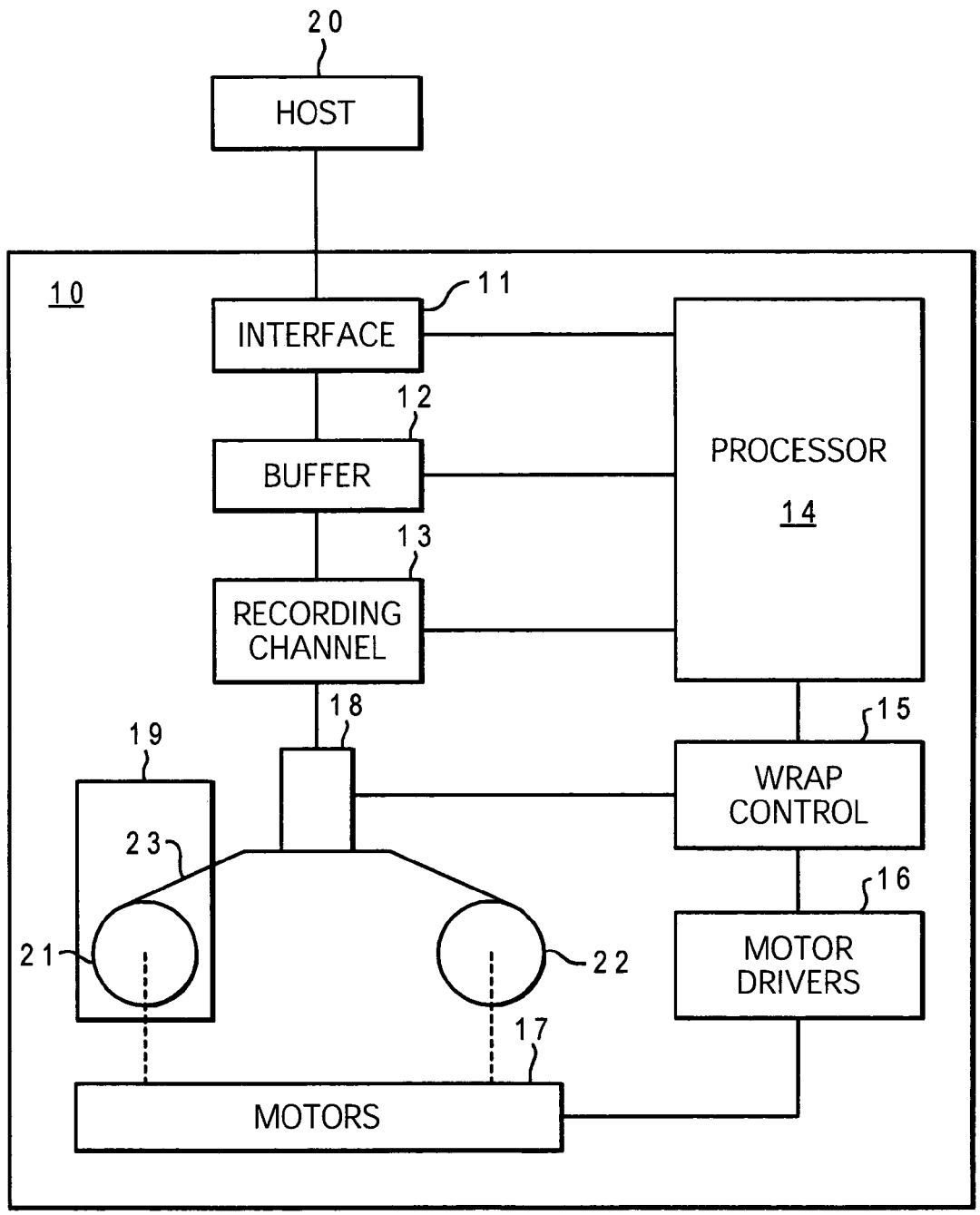
FIG. 1 is a block diagram of a magnetic tape storage system in which a preferred embodiment of the present invention can be incorporated.

Referring now to the drawings, and specifically to FIG. 1, there is depicted a magnetic tape storage system in which a preferred embodiment of the present invention can be incorporated. As shown, a magnetic tape data storage system 10 is coupled to a host computer system 20. Magnetic tape storage system 10 may be coupled to host computer system 20 directly via a standard interface such as a Small Computer Systems Interface (SCSI) or a Fibre Channel Interface. Magnetic tape storage system 10 may also be coupled to host computer system 20 through a library or over a network. Preferably, magnetic tape storage system 10 adheres to the Linear Tape Open (LTO) format that is well-known to those skilled in the art. An example of a magnetic tape storage system based on the LTO technology is the IBM 3580 Ultrium magnetic tape drive manufactured by International Business Machines Corporation of Armonk, N.Y.

A cartridge 19 having a length of magnetic tape 23 may be inserted in magnetic tape storage system 10 so that read/write heads 18 can read data from or write data onto magnetic tape 23 as magnetic tape 23 is being moved longitudinally by reels 21 and 22 that are controlled by motors 17. A processor 14 is used to operate magnetic tape storage system 10 according to various commands received from host computer system 20 at an interface 21. Along with a sequential buffer 12 and a recording channel 13, processor 14 provides data flow to be read from or written to magnetic tape 23.

Magnetic tape storage system 10 also includes a wrap control system 15 to move read/write heads 18 laterally of magnetic tape 23, and to position read/write heads 18 at a desired wrap. Wrap control system 15 may also control the operation of motors 17 through motor drivers 16, both in response to instructions from processor 14.

Host computer system 20 may issue a first Read command, a Space command and then a second Read command to magnetic tape storage system 10 in order to read data from two non-contiguous locations on magnetic tape 23. Depending on the design of magnetic tape storage system 10, data compressibility, underlying format of data, and other complex characteristics, an optimal means for locating the second read position on magnetic tape 23 is generally not readily available. Thus, magnetic tape storage system 10 has to switch its operation modes from a Read mode, to a Space mode and then back to the Read mode in order to perform the above-mentioned three commands, i.e., the first Read command, the Space command and the second Read command, in consecutive order. The overhead associated with such operation mode changes is relatively high for magnetic tape storage system 10.

Host computer system 20 may attempt to monitor the above-mentioned scenario and then issues a different series of commands when the above-mentioned scenario has been detected. However, such solution can affect a fairly significant amount of differing software layers within host computer system 20. Thus, it is more optimal for magnetic tape storage system 10 to detect the occurrence of the above-mentioned scenarios and handle them accordingly.

When handling a Space command from host computer system 20, in some situations, it is faster for magnetic tape storage system 10 to switch to a Space mode and perform a space operation as normal. However, but in other situations, it is faster for magnetic tape storage system 10 to remain in the Read mode to read data from magnetic tape 23 and discard the read data afterwards. The present invention allows magnetic tape storage system 10 to decide which way is more preferable when handling a Read command, a Space command and, may be, a Read command in consecutive order.

In accordance with a preferred embodiment of the present invention, magnetic tape storage system 10 compares the performances between switching modes and not switching modes, and then dynamically adjusts the thresholds to use the most optimal method to handle a Read command, a Space command and a Read command in consecutive order. As a result, extraneous operation mode changes, such as Read mode ->Space mode ->Read mode, can be entirely avoided when better performance can be expected by doing so.

Magnetic tape storage system 10 measures the time of Read and Space operations, and continuously calculates the threshold points where the various operations are of comparable performance. The threshold points become the decision criteria for deciding whether to switch mode or not. Since the calculation is continuous, the threshold points may be modified based on actual measured feedback, resulting in a continuously improving decision process based on the actual complex conditions that occur during operations.

Figure 2:
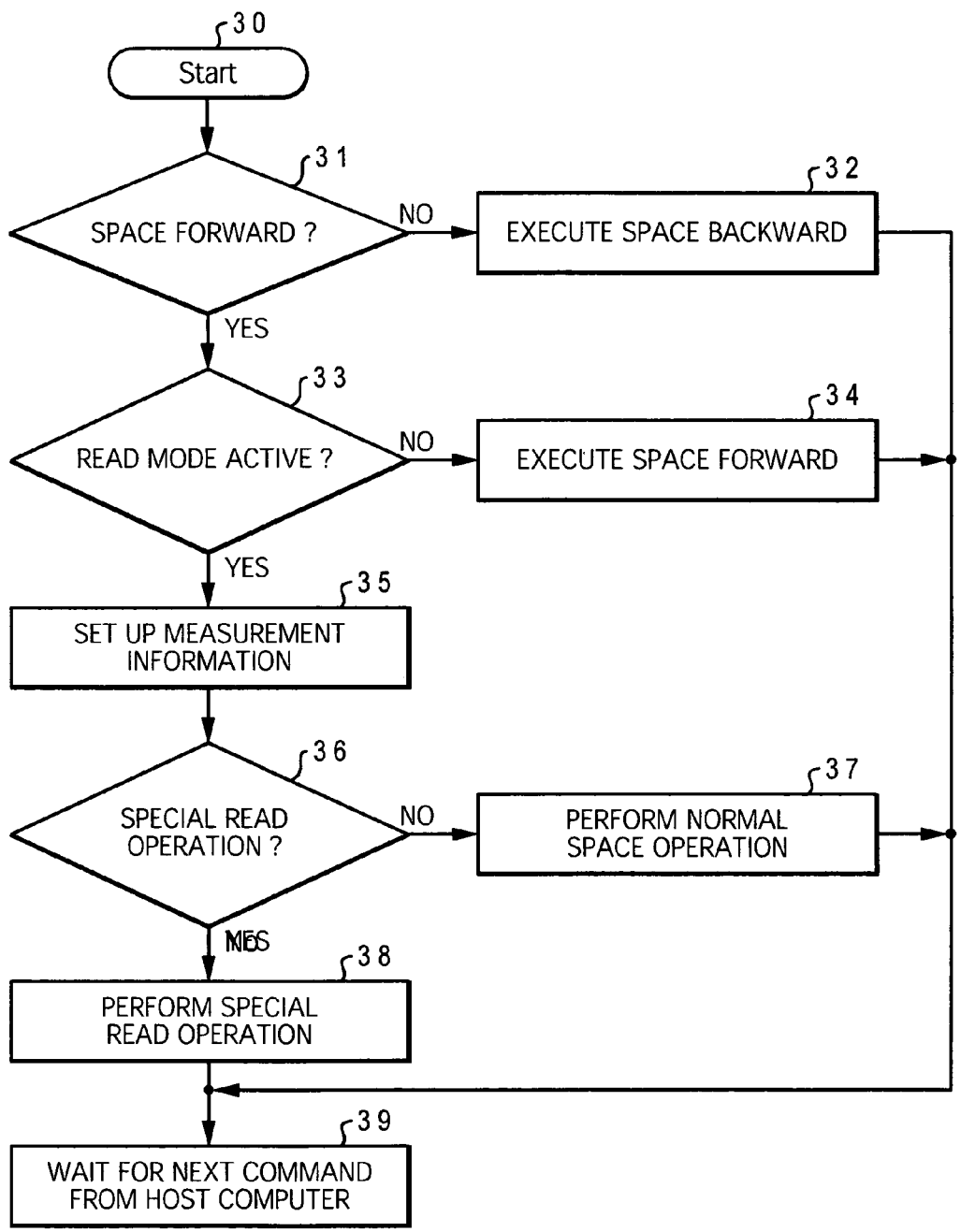
FIG. 2 is a high-level logic flow diagram of a method for the tape storage system from FIG. 1 to adaptively handle Space commands, in accordance with a preferred embodiment of the present invention.

With reference now to FIG. 2, there is depicted a high-level logic flow diagram of a method for magnetic tape storage system 10 to adaptively handle Space commands sent from host computer system 20, in accordance with a preferred embodiment of the present invention. Starting at block 30, after a Space command has been received, a determination is made as to whether or not the Space command is for a forward direction, as shown in block 31. If the Space command is not for a forward direction, then a backward space operation is executed, as depicted in block 32.

Otherwise, if the Space command is for a forward direction, another determination is made as to whether or not a Read mode is active, as shown in block 33. Magnetic tape storage system 10 (from FIG. 1) is ready to perform a read operation when the Read mode is active. If the Read mode is not active, then a forward space operation is executed, as depicted in block 34.

However, if the Read mode is active, measurement information is set up, as shown in block 35. The setting up of measurement information preferably includes starting timer, saving current block location, etc. Then, a determination is made as whether or not a special read operation should be performed in response to the Space command, as depicted in block 36. Such determination is made by comparing the estimated costs between performing a special read operation and performing a normal space operation. Specifically, time is measured, space cost against read cost are calculated, and costs are estimated based on a decision threshold. If the estimated cost of performing a special read operation is higher than the estimated cost of performing a normal space operation, then a normal space operation is performed in response to the Space command, as shown in block 37.

Otherwise, if the estimated cost of performing a special read operation is lower than the estimated cost of performing a normal space operation, then a special read operation is performed in response to the Space command, as shown in block 38. Preferably, the special read operation is a read operation with the read data discarded afterwards instead of sending to host computer system 20 (from FIG. 1). The actual cost for performing either a normal space operation (via block 37) or a special read operation (via block 38) is determined, and the actual cost is then utilized to adjust the decision threshold on which an estimation is made in block 36. In addition to relying solely on the cost differences between a normal space operation and a read operation when making an estimation in block 36, the decision threshold can be adjusted such that the less than optimal operation is executed instead. This is to prevent the process from getting stuck in one operation. Finally, magnetic tape storage system 10 waits for a next command from host computer system 20, as depicted in block 39.

As has been described, the present invention provides a method and apparatus for a magnetic tape storage system to adaptively handle Space commands sent from a host computer system. The present invention provides an optimal performance in near proximity Space operations on a magnetic tape moving in the forward direction. Because the method of the present invention does not require data to be transmitted to the host computer system, possibly over a constrained interface, various layers of overhead associated with processing useless data can be avoided.

It is also important to note that although the present invention has been described in the context of hardware, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for a tape storage system to adaptively handle Space commands sent from a host computer system, said method comprising:

in response to a Space command from said host computer system, determining whether or not said Space command is for a forward direction;

in a determination that said Space command is not for a forward direction, performing a backward space operation;

in a determination that said Space command is for a forward direction, determining whether or not said tape storage system is in a Read mode;

in a determination that said tape storage system is in a Read mode, comparing an estimated cost for performing a special read operation at least partially based on feedback from the tape storage system of at least one previously performed special read operation to an estimated cost for performing a normal space operation for said Space command at least partially based on feedback from the tape storage system of at least one previously performed normal space operation;

performing a special read operation when the estimated cost for performing a special read operation is lower than the estimated cost for performing a normal space operation for said Space command; and performing a normal space operation when the estimated cost for performing a special read operation is higher than the estimated cost for performing a normal space operation for said Space command, wherein said performing a special read operation further includes discarding all data read during said special read operation without transferring the data read during said special read operation to said host computer system.

2. The method of claim 1, wherein if the Space command is for a forward direction and the tape storage system is not in a Read mode, then a forward space operation is executed without performing the comparing.

3. The method of claim 1, wherein said method further includes in a determination that said tape storage system is not in a Read mode, performing a normal space operation.

4. The method of claim 1, wherein said method further includes determining an actual cost for performing either said normal space operation or said special read operation after a performance of one of said operation, wherein said actual cost is utilized to adjust a decision threshold on which said estimated costs are based.

5. A tape storage system capable of adaptively handling Space commands sent from a host computer system, said tape storage system comprising:

means for determining, in response to a Space command from said host computer system, whether or not said Space command is for a forward direction;

means for, in a determination that said Space command is not for a forward direction, performing a backward space operation;

means for, in a determination that said Space command is for a forward direction, determining whether or not said tape storage system is in a Read mode;

means for, in a determination that said tape storage system is in a Read mode, comparing an estimated cost for performing a special read operation at least partially based on feedback from the tape storage system of at least one previously performed special read operation to an estimated cost for performing a normal space operation for said Space command at least partially based on feedback from the tape storage system of at least one previously performed normal space operation;

performing a special read operation when the estimated cost for performing a special read operation is lower than the estimated cost for performing a normal space operation for said Space command; and performing a normal space operation when the estimated cost for performing a special read operation is higher than the estimated cost for performing a normal space operation for said Space command, wherein said performing a special read operation includes discarding all data read during said special read operation without transferring the data read during said special read operation to said host computer system.

6. The tape storage system of claim 5, wherein if the Space command is for a forward direction and the tape storage system is not in a Read mode, then a forward space operation is executed without performing the comparing.

7. The tape storage system of claim 5, wherein said tape storage system further includes in a determination that said tape storage system is not in a Read mode, means for performing a normal space operation.

8. The tape storage system of claim 5, wherein said tape storage system further includes means for determining an actual cost for performing either said normal space operation or said special read operation after a performance of one of said operation, wherein said actual cost is utilized to adjust a decision threshold on which said estimated costs are based.

9. A computer storage medium having a computer program product for enabling a tape storage system to adaptively handle Space commands sent from a host computer system, said computer storage medium comprising:

computer program code for determining, in response to a Space command from said host computer system, whether or not said Space command is for a forward direction;

computer program code for, in a determination that said Space command is not for a forward direction, performing a backward space operation;

computer program code for, in a determination that said Space command is for a forward direction, determining whether or not said tape storage system is in a Read mode;

computer program code for, in a determination that said tape storage system is in a Read mode, comparing an estimated cost for performing a special read operation at least partially based on feedback from the tape storage system of at least one previously performed special read operation to an estimated cost for performing a normal space operation for said Space command at least partially based on feedback from the tape storage system of at least one previously performed normal space operation;

performing a special read operation when the estimated cost for performing a special read operation is lower than the estimated cost for performing a normal space operation for said Space command; and performing a normal space operation when the estimated cost for performing a special read operation is higher than the estimated cost for performing a normal space operation for said Space command, wherein said performing a special read operation includes discarding all data read during said special read operation without transferring the data read during said special read operation to said host computer system.

10. The computer storage medium of claim 9, wherein if the Space command is for a forward direction and the tape storage system is not in a Read mode, then a normal space operation is performed without performing the comparing.

11. The computer storage medium of claim 9, wherein said computer usable medium further includes program code means for performing a normal space operation, in a determination that said tape storage system is not in a Read mode.

12. The computer storage medium of claim 9, wherein said computer usable medium further includes program code means for determining an actual cost for performing either said normal space operation or said special read operation after a performance of one of said operation, wherein said actual cost is utilized to adjust a decision threshold on which said estimated costs are based.

* * * * *